C. HUNT.
STARTER FOR COMBUSTION ENGINES.
APPLICATION FILED JAN. 3, 1910.
1,050,026.
Patented Jan. 7, 1913.
3 SHEETS—SHEET 3.
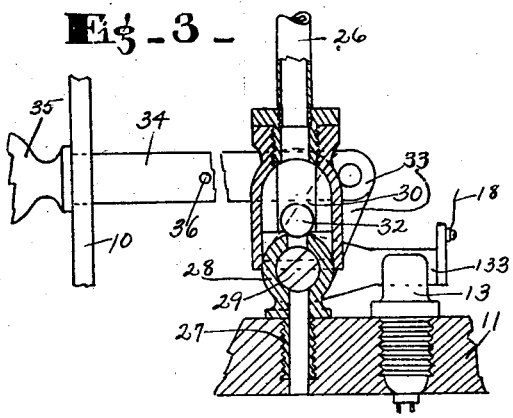
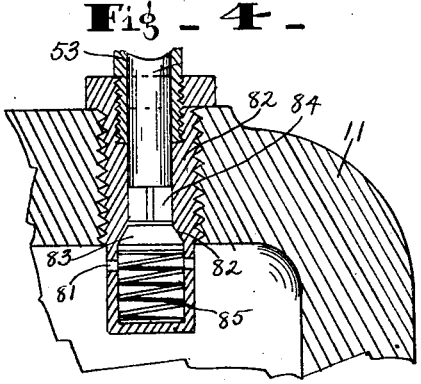
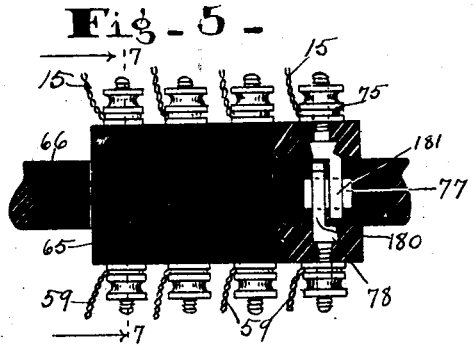
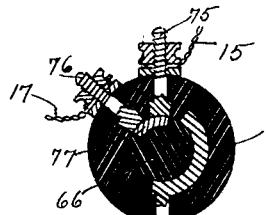
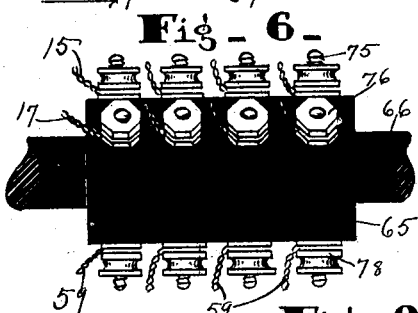
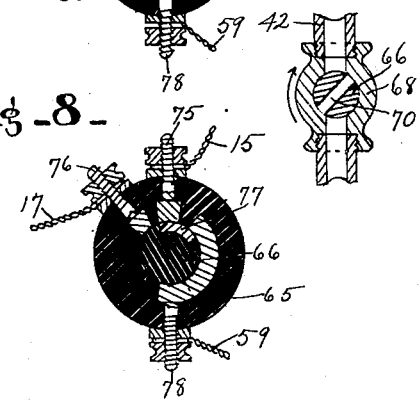
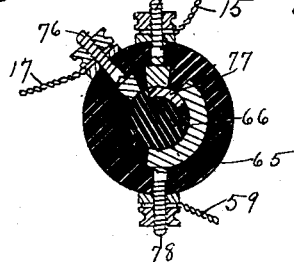
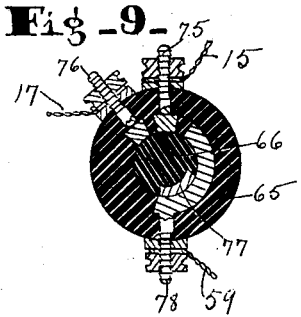
WITNESSES:
W. M. Gentle
O. M. McLaughlin
INVENTOR.
Carl Hunt.
BY
V. H. Lockwood
ATTORNEY.

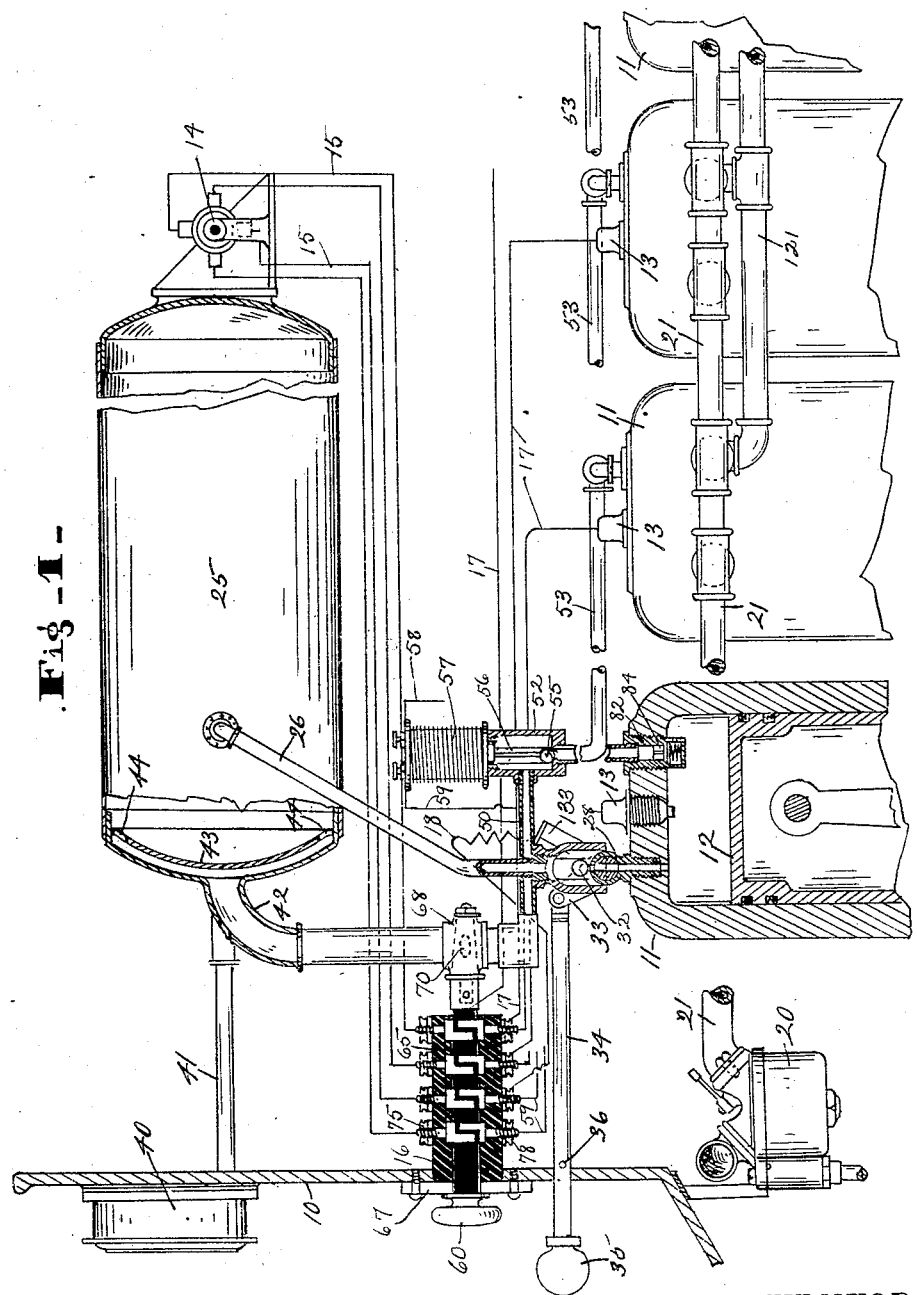

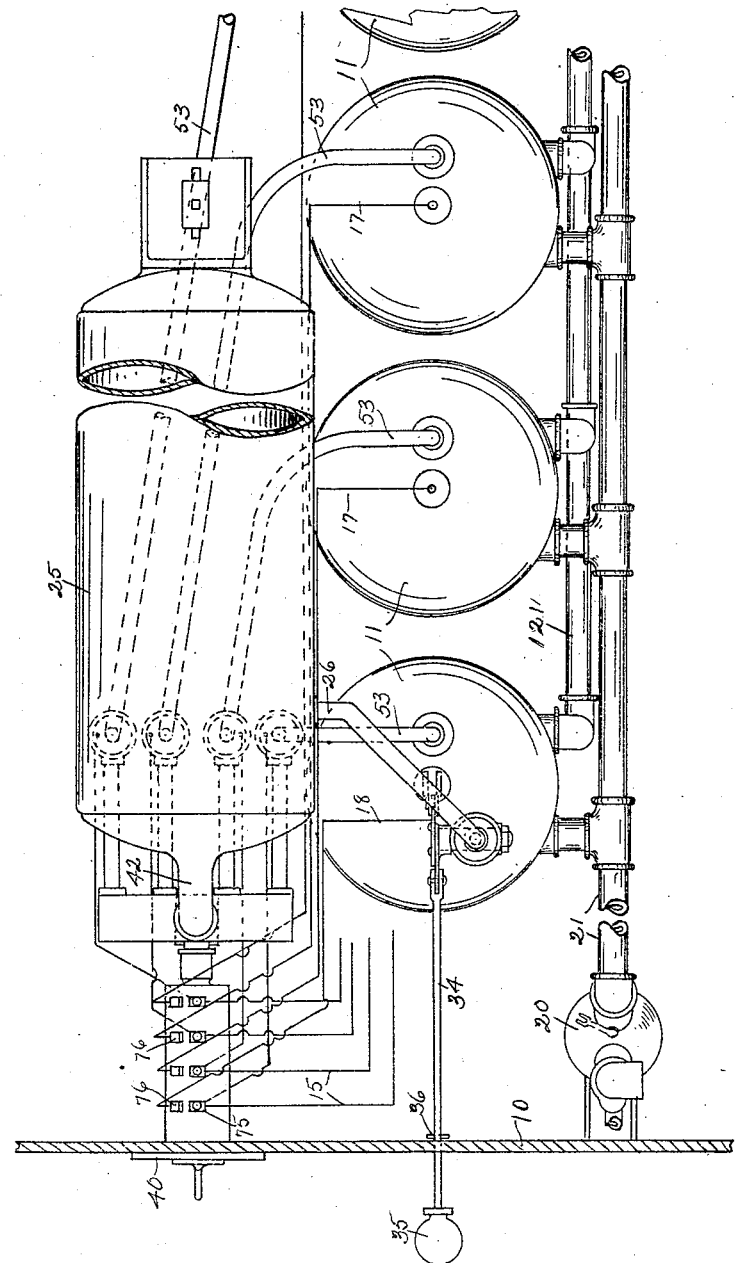

UNITED STATES PATENT OFFICE.

CARL HUNT, OF INDIANAPOLIS, INDIANA.

STARTER FOR COMBUSTION-ENGINES.

1,050,026.  Specification of Letters Patent.  Patented Jan. 7, 1913.

Application filed January 3, 1910. Serial No. 535,963.

*To all whom it may concern:*

Be it known that I, CARL HUNT, of Indianapolis, county of Marion, and State of Indiana, have invented a certain new and useful Starter for Combustion-Engines; and I do hereby declare that the following is a full, clear, and exact description thereof, reference being had to the accompanying drawings.

The object of this invention is to provide a practical and efficient means for starting combustion engines without cranking the same, either by hand or otherwise.

The chief feature of the invention consists in storing combustible gas obtained from the carbureter, and therefore in combustible condition, and introducing the quantity of said stored gas into the cylinder of the engine which is ready for ignition or the explosion of the gas. The explosion of such charge of gas in one of the cylinders will turn the crank shaft and start the engine.

The combustible gas to be stored may be drawn directly from the carbureter by means of a pump of some sort, but one feature of this invention is to take the combustible gas from the cylinder, after it has entered the cylinder from the carbureter, and therefore is in combustible condition, and store the gas from the cylinder. Therefore, one is sure that the gas which is subsequently employed to start a cylinder is identical in character with the combustible gas regularly supplied to the cylinders for explosion.

Another feature of the invention consists in utilizing one of the cylinders of the engine, where there is a plurality of cylinders, for pumping the combustible gas into a compression tank. In other words, said cylinder of the engine both supplies the gas for storing purposes and pumps or forces it from the cylinder into the storage tank, the piston in the cylinder acting like the piston in a pump for supplying the gas from the cylinder into the storage tank. When the storage tank is charged, then the mechanism is arranged so that the said cylinder will cease to act as a pump but will continue thereafter to perform its regular duty as an engine cylinder. This storage through the agency of one of the cylinders is done after the engine has gotten under way, so that the gas is stored in the tank ready for starting the engine after it stops the next time, and in fact, one storage of gas in the tank may be used to start the engine several times.

Another feature of the invention consists in the means for converting the cylinder of the engine into a pump and storing gas therefrom in the tank, and for charging it back to a cylinder engine. This means is controlled manually and is so arranged that when the spark plug in said cylinder is disconnected from its source of electricity, a valve will be caused to open the conduit leading from the cylinder to the storage tank. Hence as the piston operates in the cylinder, it will force the combustible gas as it enters the cylinder through said conduit to the storage tank, and when the pressure in the tank is great enough, said regulating means is again operated to close the port to the storage tank and restore the current to the spark plug.

Another feature of the invention consists in the manually operated means for opening a valve that controls the conduit leading from the storage tank to the various cylinders, to permit gas from the storage tank to enter said cylinders, at least the one which is in condition for explosion.

The nature of the invention will be understood from the accompanying drawings and the following description and claims.

In the drawings, Figure 1 is a side elevation of the device, being practically a central vertical longitudinal section through the forward portion of an automobile and certain parts being in section and other parts being broken away and the device being shown in condition for storing gas in the storage tank. Fig. 2 is a plan view of the same with the hidden parts indicated by dotted lines. Fig. 3 is a detail showing the means for closing the ignition circuit to a cylinder, and also for closing the conduit from the cylinder to the storage tank, parts being shown in their positions when the cylinder is not operating as a pump but as a part of the engine. Fig. 4 is a central vertical section through a portion of the combustion end of the cylinder and the intake from the storage tank. Fig. 5 is one side elevation of the switch mechanism for controlling the electric circuits in the device, parts being broken away. Fig. 6 is an elevation of the opposite side of what is shown in Fig. 5. Fig. 7 is a transverse section on the line 7—7 of Fig. 5, showing the parts in position for closing the ignition circuit. Fig. 8 is the same as Fig. 7 with the ignition circuit broken and the operation of the switch begun for closing the magnet circuit. Fig. 9 is the same showing the complete operation of the switch for closing the magnet circuit. Fig. 10 is a central transverse vertical section through a portion of the conduit leading from the storage tank and cutting through the valve for controlling the same.

The drawings herein show a four-cylinder engine as used in automobiles and mounted adjacent the dash 10 of an automobile. There are four cylinders 11 arranged in a row, and each cylinder has a piston 12 connected with the crank shaft (not shown) as usual. In the upper end of each cylinder there is a centrally situated spark plug 13. They are supplied with current from a magneto (not shown) in connection with which the timer 14 is mounted and operates. Any type of timer may be used, and wires 15 run from the timer to the manually operated switch mechanism 16, and therefrom wires 17 run to the spark plugs to three of the cylinders, and wire 18 is arranged to conduct the electricity to the spark plug of the remaining cylinder, the one shown at the left-hand end of the series. As will hereafter be explained, the timer indicates at the switch 16 which of the cylinders is ready for a charge of gas and actuating explosion, as the ignition of the gas in the various cylinders is regulated in a manner well known. A carbureter 20 furnishes gas in a combustible condition to the cylinders through the connection 21, or in any other well known manner, as the means for conveying combustible gas to the cylinders is immaterial so long as combustible gas enters all the cylinders.

121 is the exhaust tube.

The plan is to start the piston in the cylinder which is ready to spark by introducing a charge of gas into the cylinder thereof, which gas is of the same character and quality as is employed to drive the pistons regularly. Hence this supply of gas must come from the carbureter either directly or indirectly. In the form herein shown it comes indirectly in the following manner: The combustible gas which enters the left-hand cylinder and enters one of the cylinders, herein the left-hand one, from the carbureter is compressed and stored in the storage tank 25, being forced into said tank through the pipe 26 out of said cylinder. In other words, for a small space of time the combustible gas which normally enters said cylinder, is utilized for charging a tank instead of exploding and driving the piston, and the piston is used to force said gas from the cylinder through the pipe 26 into the tank 25. As shown in Fig. 3, the pipe 26 is in communication with the cylinder through the sleeve plug 27 that screws into a hole in the head of the cylinder, and in said conduit 26 there is a positive valve chamber 28 with a positive or cut-off valve 29 therein, and also a valve chamber 30 for a body or check valve 32 or similar valve which will prevent the back movement of the gas which enters the pipe 26. The purpose of the valve 29 is to close the conduit 26 effectively while the cylinder is being used for engine purposes in order to resist the explosion of gas in the cylinder. Therefore rather a strong valve construction is necessary. The valve 29 is actuated by a bell crank 33 secured to the shaft or spindle thereof outside the casing 28, and from one arm of the lever 33 a push-rod 34 extends through the dash 10 and has a knob 35 in a convenient position for the driver of the automobile to manipulate. The pin 36 engages the dash and stops the movement of the rod in one direction while the knob 35 stops its movement in the other direction. One arm 133 of the bell crank lever 33 engages the spark plug 13 in the cylinder. When the lever is down in the position shown in Fig. 3, the arm 133 electrically connects the wire 18 to the spark plug, and then the cylinder will operate as an engine, and when the arm 133 of the lever 33 is separated from the spark plug 13, as shown in Fig. 1, the first cylinder to the left will operate as a pump. Hence a single means, rod 34, makes or breaks the ignition circuit of the spark plug 13, and at the same time opens or closes the cut-off valve 29. This insures the closing of the valve 29 before the spark plug can ignite any gas in the cylinder and cause an explosion. To constitute a better connection between the parts 133 and plug 13, said plug has a vertical slot in it into which the arm 133 enters like a knife blade. A pressure gage 40 is secured on the dashboard and is in communication through the conduit 41 with the tank 25 so as to register the pressure therein. There is a central outlet conduit 42 from one end of the tank and that outlet is protected by a plate 43 within the tank and parallel with but spaced from the end wall of the tank so as to form a small chamber between them, which chamber is in communication with the outlet 42 and also the interior of the tank through the openings 44 at the top and bottom to insure proper mixture of the gas and air. From the lower end of the gas tube 42 leading from the tank a pipe 50 leads to each of four valve chambers 52 from which pipes 53 lead to the various cylinders to charge them for starting purposes. In each valve case 52 there is a ball-shaped check valve 55 on the lower end of the stem 56 which is connected with the core of an electromagnet 57, so that said magnet can lift the check valve while starting the engine, but at other times the valve will be closed. Said magnets 57 are grounded through wire 58 in one side and wire 59 leads from the other side to the electric switch that is controlled by the knob 60. Through this electric switch the magnets are in communication with the battery (not shown) through the timer, and hence only one of said magnets will be energized at a time, and it will elevate the corresponding valve 53, and that will permit the gas to pass to the proper one of the four cylinders.

The electric switch arrangement is as follows: There is a casing 65 of insulating material surrounding the rod 66 made of insulating material that extends through the dash and plate 67 and carries a knob 60 at one end, and at the other end extends through the valve casing 68 in the gas tube 42 from the storage tank and has a port 70 that is adapted to register with said passageway when the rod is in one position, and when turned to the position shown in Fig. 10 said rod closes the passageway. The portion of the rod in the casing 68 performs the function of a valve. In the switch casing 65 there is a series of four terminals 75 with which the wires 15 from the timer are connected. These terminals extend radially through the tubular casing to the interior periphery thereof. There is also a parallel series of four terminals 76 with which the ignition wires 17 are connected. The terminals 76 are arranged like the terminals 75 and beside the same, as shown in Fig. 7, so that the inner ends of each pair of terminals 75 and 76 will be near each other in position to be bridged by one of the metal contacts 77 embedded in the periphery of the rod 66. There is a contact 77 for each pair of terminals 75 and 76. Hence when the rod 66 is in the position shown in Fig. 7, it will bridge every pair of terminals 75 and 76 and close the ignition circuits, and when in that position, the valve portion of the rod 66 is in the position shown in Fig. 10 for closing the conduit 42 from the storage tank. There is also a series of terminals 78 extending through said tubular casing 65 almost diametrically opposite the series of terminals 75, and the terminals 78 have the wires 59 from the magnets connected with them. These terminals 78, as shown in Fig. 5, have on their inner ends upwardly curved extensions 180 that are parallel with similar but oppositely extending extensions 181 from the opposite terminals 75. These extensions 180 and 181 are in position to be engaged by the contact 77 during practically a half revolution of the rod 66, that is, from the position shown in Fig. 8 to the position shown in Fig. 9. As the rod 66 is being turned from the position shown in Fig. 10 to the position to cause the valve to open the passageway 42, the contacts 77 bridge the terminals 75 and 78 before the valve, shown in Fig. 10, arrives at the open position, and hence ample time is given for the magnets 57 to be energized and the ball valves 59 elevated thereby. Then the pipes 53 will be open for the passage of gas from the storage tank as quickly as the valve 70 is in the open position. If the magnets were not energized before the gas under pressure is turned on through the conduit 42, the pressure of the gas would tend to hold the ball valves closed and interfere with their being opened by the magnets.

The valve construction shown in Fig. 4 is employed at the intake from the tubes 53 leading to the cylinders for admitting the gas from the storage tank. The casing projects inwardly beyond the wall of the cylinder and is closed at its end but has laterally extending ports 81 in its side and some distance above the lower end of the casing. The casing is provided with a tapering valve seat 82 and within the casing there is a valve with a tapering head 83 and a four-winged shank 84 extending upwardly therefrom for guiding the same. The spring 85 in the lower end of the casing holds the valve normally closed. While the cylinder is in ordinary use valve 83 is held closed both by the spring and the outward pressure of the gases in the cylinder. When starting the engine the gas under pressure from the storage tank is introduced through pipe 53 and forces the valve down far enough for the gas to enter the ports 81 and charge the cylinder.

The operation of the mechanism is as follows: After the automobile is under way, the knob 35 is drawn by the driver toward him to the position shown in Fig. 2. That breaks the ignition circuit for one of the cylinders and opens the conduit 26 to the storage tank 25. As the piston 12 in said cylinder operates, it will draw in combustible gas from the carbureter as usual on the downward movement of the piston, and on the reverse movement will force the gas through the conduit 26 into the tank 25. After it passes above the ball valve 32 the gas cannot return. This storing of the gas from the carbureter as pumped by the piston continues until the pressure in the tank 25 has reached the desired degree, as indicated by the gage 40. Then the knob 35 is pushed inward, as indicated in Fig. 3. That converts the first cylinder and piston from a pump to an engine, and it performs its work as usual along with the other cylinders and pistons, the arm 133 closing the ignition circuit and the valve in the pipe 26 being closed. While the engine is operating normally and while the storage tank is being filled as stated above, the switch mechanism shown in Figs. 5 to 10 is in the position shown in Figs. 7 and 10, that is, the ignition circuits are closed and the passageway 42 from the storage tank is closed also. After the automobile has stopped and one wishes to start the engines, he turns the knob 60 so as to turn the rod 66 from the position shown in Fig. 7 to the position shown in Fig. 8, that is, so as to break the ignition circuits and to close the magnet circuits which are normally open. As soon as said magnet circuits are closed, one magnet according to the selection of the timing device will be energized and will open the valve 55, for one of the tubes 53 leading to one of the cylinders, the one which, as indicated by the timing device, is in the sparking and explosive condition. The knob 60 is not stopped, however, in the position shown in Fig. 8, but the operator continues to turn it until the valve 70 is opened and the gas then under pressure in the tank 25 can rush into said cylinder, the one ready to receive it. When sufficient gas has entered the cylinder, as indicated by the gage 40 showing the diminution of pressure in the tank 25, the knob 60 is turned back to its normal position, as shown in Fig. 7. That restores the ignition circuits, whereupon the charge of gas just introduced into one of the cylinders will be exploded and that will give the crank shaft the desired actuation for starting the engine. After getting under way again the tank 25 may be renewed to the extent that it has been diminished and be ready for starting again, or one charge of said tank may be used to start the engine more than one time.

What I claim as my invention and desire to secure by Letters Patent is:

1. The combination with a multiple cylinder combustion engine, of a reservoir, a conduit extending from said reservoir to the combustion end of one cylinder, a valve in said conduit, a bell-crank lever in connection with said valve, means for operating said lever, a spark plug in said cylinder in position to be engaged by said lever when said valve is closed, an ignition circuit connected with said lever which is closed when the lever is in engagement with the spark plug, and valve controlled means for supplying gas from said reservoir to the cylinders of the engine for starting the same.

2. Mechanism for starting combustion engines including the combination with an engine cylinder, of a reservoir containing fuel, a conduit from the reservoir to the cylinder, an electromagnet actuated valve for closing said conduit, a circuit for giving current to said magnet, a valve for closing said conduit between the reservoir and electromagnet actuated valve, and a single means for closing the circuit to the magnet and opening said last-mentioned valve.

3. Mechanism for starting combustion engines including the combination with an engine cylinder, of a reservoir containing fuel, a conduit from the reservoir to the cylinder, an electromagnet actuated valve for closing said conduit, a circuit for giving current to said magnet, a valve for closing said conduit between the reservoir and electromagnet actuated valve, and means arranged to close the circuit of said magnet in advance of the opening of said last-mentioned valve.

4. The combination with a multiple cylinder engine, of a reservoir for fuel, a single conduit leading from the reservoir that divides into branch conduits leading to the respective cylinders, a valve for closing each branch conduit, a timer, magnets electrically connected with the timer for actuating each valve, a valve in the single portion of said conduit, and a single means for opening said last-mentioned valve and closing the circuits between the timer and magnets.

5. The combination with a multiple cylinder engine, of a reservoir for fuel, a single conduit leading from the reservoir that divides into branch conduits leading to the respective cylinders, a valve for closing each branch conduit, a timer, magnets electrically connected with the timer for actuating each valve, a valve in the single portion of said conduit, and a switch rod for closing the circuits between the timer and magnets and subsequently opening said last-mentioned valve.

6. The combination with a multiple cylinder engine, of a reservoir for fuel, a single conduit leading from the reservoir that divides into branch conduits leading to the respective cylinders, a valve for closing each branch conduit, a timer, magnets electrically connected with the timer for actuating each valve, a valve in the single portion of said conduit, a rod for operating said last-mentioned valve which has in its periphery metal contacts, a casing of insulating material in which said rod is mounted so it can be turned, terminals on one side of said casing with segmental extending arms, wires between the timer and said terminals, terminals in another side of said casing with segmentally extending arms parallel with the arms of the other terminals, said terminals and the arms thereof being all situated so that the contacts on said rod may engage and bridge the parts of each pair of terminals, and wires from the last-mentioned terminals to the magnets the terminals being so arranged that when said rod holds the valve in the single portion of the reservoir conduit closed the circuits between the timer and magnets will be broken, and when said rod is turned it will first close said circuits and subsequently open said last-mentioned valve.

7. The combination with a multiple cylinder engine, of an ignition circuit for each cylinder, a timer for controlling the same, a fuel reservoir in communication with each cylinder, magnet actuated valve for controlling the fuel conduit to each cylinder, and a switch for throwing each magnet into communication with the timer and breaking the ignition circuit, whereby the energization of said magnets and the passage of fuel to the cylinders will be controlled by the timer and said switch.

8. The combination with a multiple cylinder engine, of a reservoir for fuel, a single conduit leading from the reservoir that divides into branch conduits leading to the respective cylinders, a valve for closing each branch conduit, a timer, an ignition circuit for each cylinder, a valve for controlling the single portion of said reservoir conduit, a switch for simultaneously closing the ignition circuits and said last-mentioned valve, magnets electrically connected with the timer through said switch for actuating each valve in the branch conduits, and parts arranged so that when the switch is operated it will break the ignition circuits and close the circuits between the timer and magnets and afterward open the valve in the single portion of the reservoir conduit.

9. In a starting device for internal combustion engines, the combination with an explosion cylinder and a tank containing gas under pressure, of a conduit leading therefrom and operatively connected to the cylinder, a valve for controlling the admission of gas to said cylinder from the conduit, a magnet operatively mounted with relation to the valve and adapted to actuate the same when energized, electrically operated ignition devices for the cylinder, and shiftable manually operated means for energizing said magnet to lift the valve and permit the passage of gas to the cylinder said manually operated means when shifted in one direction to energize said magnet, simultaneously rendering the ignition devices inoperative, and when shifted in the other, cutting off the flow of gas to the cylinder and simultaneously rendering the ignition devices operative 10. In a starting device for internal combustion engines, the combination with a cylinder having an inlet for explosive mixture and an independent inlet for explosive compressed gas, of electrically-operated devices controlling the admission of compressed gas to the cylinder, an ignition device for said cylinder, a primary battery normally in circuit with the ignition device, and means movable in one direction for breaking the circuit from the primary battery to the ignition devices and establishing a circuit from the primary battery to the gas-controlling devices and movable in the opposite direction to establish the circuit from the battery to the ignition devices and break the circuit to the gas-controlling devices.

In witness whereof, I have hereunto affixed my signature in the presence of the witnesses herein named.

CARL HUNT.

Witnesses:
G. H. BOINK,
O. M. McLAUGHLIN.